(12) United States Patent
Foucher et al.

(10) Patent No.: US 11,840,548 B2
(45) Date of Patent: Dec. 12, 2023

(54) UV-CURABLE PHOSPHONIUM SMALL MOLECULES AS ANTIMICROBIAL COATINGS AND SURFACE ACTIVE ADDITIVES

(71) Applicant: SCI RESOURCE PLATFORM INC., Toronto (CA)

(72) Inventors: Daniel Foucher, Toronto (CA); Alexander Gabriel Caschera, Amaranth (CA); Joseph Bedard, Halifax (CA)

(73) Assignee: SCI RESOURCE PLATFORM INC., Toronto (CA)

(*) Notice: Subject to any disclaimer, the term of this patent is extended or adjusted under 35 U.S.C. 154(b) by 133 days.

(21) Appl. No.: 17/404,417

(22) Filed: Aug. 17, 2021

(65) Prior Publication Data
US 2022/0056058 A1 Feb. 24, 2022

Related U.S. Application Data

(60) Provisional application No. 63/068,539, filed on Aug. 21, 2020.

(51) Int. Cl.
*C07F 9/54* (2006.01)
*C09D 5/14* (2006.01)
(Continued)

(52) U.S. Cl.
CPC ............ *C07F 9/5407* (2013.01); *B05D 3/067* (2013.01); *C07F 9/5442* (2013.01); *C09D 5/14* (2013.01);
(Continued)

(58) Field of Classification Search
CPC ........ C07F 9/5407; C07F 9/54; C07F 9/5442; C07C 49/215
See application file for complete search history.

(56) References Cited

U.S. PATENT DOCUMENTS 10,939,684 B2 3/2021 Foucher et al.
10,961,401 B2 3/2021 Porosa et al.
(Continued)

FOREIGN PATENT DOCUMENTS

WO 2014089680 A1 6/2014

OTHER PUBLICATIONS

Balema, Chem. Commun., 2002, 724-725 (Year: 2002).*
(Continued)

*Primary Examiner* — Robert C Boyle
(74) *Attorney, Agent, or Firm* — HILL & SCHUMACHER

(57) ABSTRACT

The attachment and proliferation of antibiotic resistant, biofilm-forming bacteria to oft-handled material surfaces has emerged as a growing concern, particularly in the biomedical, healthcare and food packaging industries. UV-curable phosphoniums bearing benzophenone anchors have been synthesized with a variety of alkyl, aryl, and fluoroalkyl functional groups at phosphorus to probe their efficacy as thermally stable antimicrobial additives in plastics or as surface coatings. In an embodiment, a phosphonium compound having the following formula has been synthesized:

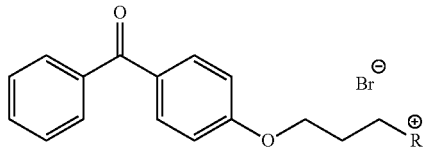

in which R is a phosphine group substituted with alkyl, aryl, substituted alkyl, substituted aryl, heteroalkyl or any combination thereof. These materials maintained the ability to
(Continued)

kill biofilm-forming bacteria even after being subject to abrasion processes, demonstrating the potential to serve as long-term antimicrobial materials.

29 Claims, 10 Drawing Sheets

(51) Int. Cl.
  *C09D 7/80* (2018.01)
  *B05D 3/06* (2006.01)
  *C09D 7/63* (2018.01)
(52) U.S. Cl.
  CPC ............. *C09D 7/63* (2018.01); *C09D 7/80* (2018.01); *B05D 2201/02* (2013.01)

(56) References Cited

U.S. PATENT DOCUMENTS

2018/0127598 A1* 5/2018 Porosa ............... C09D 5/1625
2018/0343870 A1* 12/2018 Foucher ............. C07F 9/4006

OTHER PUBLICATIONS

Luque-Ortega, J. Med. Chem. 2010, 53, 1788-1798 (Year: 2010).*
Neckers, Macromolecules 1984, 17, 2468-2473 (Year: 1984).*
Wang, J. Org. Chem., 2004, 69, 2693-2702 (Year: 2004).*
Joseph Bedard, Alexander Caschera, and Daniel A. Foucher, "Access to thermally robust and abrasion resistant antimicrobial plastics: synthesis of UV-curable phosphonium small molecule coatings and extrudable additives", RSC Adv. 2021, 11, 5548-5555.
Rachel L. Shum, Siobhan R. Liu, Alexander Caschera, and Daniel A. Foucher, "UV-Curable Surface-Attached Antimicrobial Polymeric Onium Coatings: Designing Effective, Solvent Resistant Coatings for Plastic Surfaces", ACS Appl. Bio. Mater. 2020, 3 (7), 4302-4315.
Alexander Caschera, Kamlesh B. Mistry, Joseph Bedard, Evan Ronan, Moiz A. Syed, Aman U. Khan, Alan J. Lough, and Daniel A. Foucher, "Surface-attached sulfonamide containing quaternary ammonium antimicrobials for textiles and plastics", RSC Adv. 2019, 6, 3140-3150.
Porosa, L.; Caschera, A.; Bedard, J.; Mocella, A.; Ronan, E.; Lough, A. J.; Wolfaardt, G.; Foucher, "UV-Curable Contact Active Benzophenone Terminated Quaternary Ammonium Antimicrobials for Applications in Polymer Plastics and Related Devices", D. A. Acs Appl. Mater. Interfaces 2017, 9, 27491-27503.
Cuthbert T. J. et al., "Surprising Antibacterial Activity and Selectivity of Hydrophilic Polyphosphoniums Featuring Sugar and Hydroxy Substituents", Angew. Chemie—Int. Ed. 2018, 130, pp. 12889-12892.
Guterman, R et al., "Fluorinated Polymerizable Phosphonium Salts from PH3: Surface Properties of Photopolymerized Films" Polym. Sci. Part A Polym. Chem, 2013, 51, pp. 2782-2792.
Cuthbert, T. J et al. "Synthesis, Properties, and Antibacterial Activity of Polyphosphonium Semiinterpenetrating Networks", I. Mater. Chem. B, 2016, 4, pp. 4872-4883.
Kue, Y. et al., "Antimicrobial Polymeric Materials with Quaternary Ammonium and Phosphonium Salts", Int. I. Mol. Sci. 2015, 16, pp. 3626-3655.
International Search report for PCT application PCT/CA2021/051134 dated Feb. 2, 2022, 4 pages.

* cited by examiner

FIG. 2A
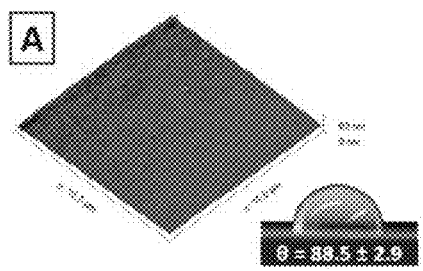
FIG. 2D
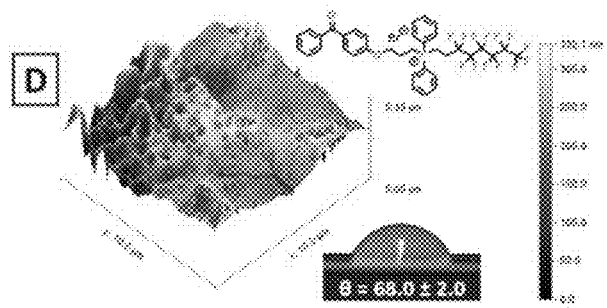
Fig 2B
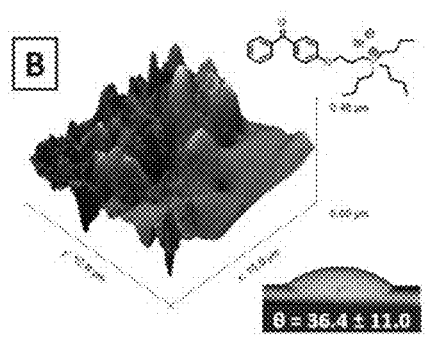
Fig 2E
| Material | Thickness (nm)ª | RMS Roughness (nm) |
|---|---|---|
| PC control | N/A | 2.587 |
| PC coated with 2 | 47.45 ± 11.34 | 55.50 |
| PC coated with 3 | 94.64 ± 38.38 | 32.11 |
| PC coated with 4 | 105.83 ± 13.52 | 35.45 |
Fig 2C
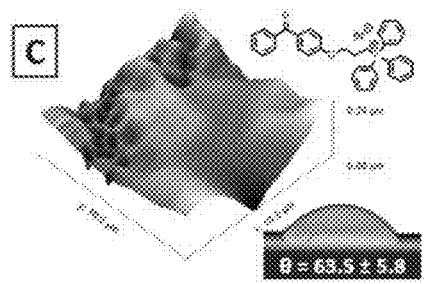

FIG. 7A
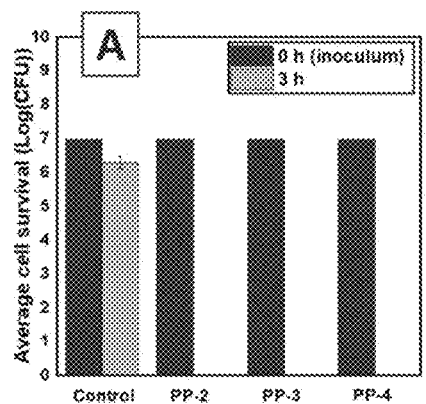
FIG. 7B
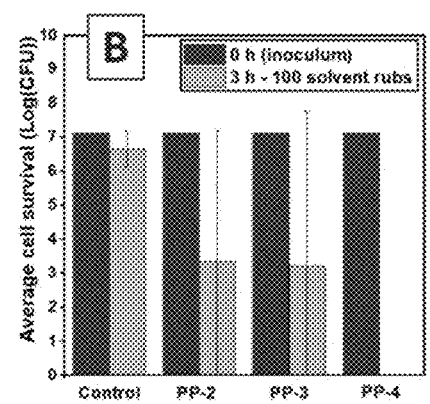
*100 Solvent Double Rubs* →
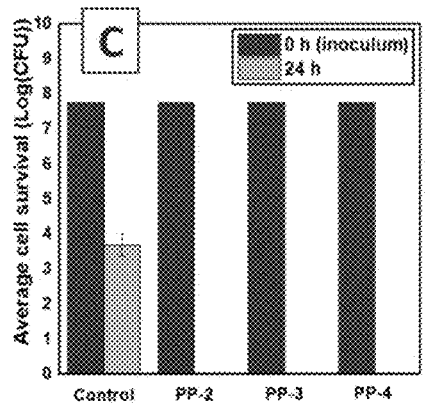
*100 Solvent Double Rubs* →
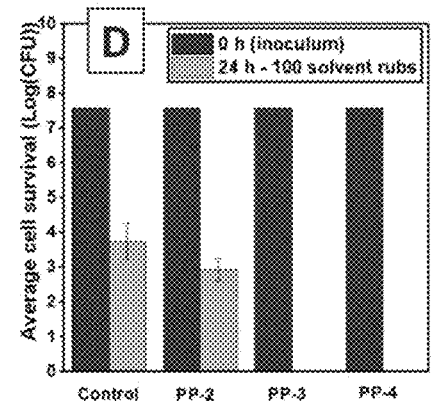
FIG. 7C
FIG. 7D

UV-CURABLE PHOSPHONIUM SMALL MOLECULES AS ANTIMICROBIAL COATINGS AND SURFACE ACTIVE ADDITIVES

FIELD

The present disclosure relates to UV-curable phosphonium small molecules for use in coatings and surface-active additives for use in producing long term antimicrobial plastics.

BACKGROUND

The attachment and proliferation of antibiotic resistant, biofilm-forming bacteria to oft-handled material surfaces has emerged as a growing concern, particularly in the biomedical, healthcare and food packaging industries.[1-7] The cost of healthcare-associated infections (HCAIs) has been estimated at nearly a billion dollars annually.[8] Despite the widespread use of disinfectants and implementation of improved sanitation protocols for healthcare[9] and food processing plant workers,[5] the threat of pathogenic, biofilm-forming microbiota remains significant. Compounding this is the growing prevalence of antibiotic-resistant bacterial strains, brought on by the over-prescription of antibiotics and overuse of common disinfectants at sub-lethal concentrations.[10] This ongoing threat has necessitated a preventative approach to combat the proliferation of biofilm forming-bacteria, and has inspired the development of biocide-releasing and tethered, immobilized biocide surface to meet this challenge.[11-14] Biocide-releasing surfaces, while in some cases effective as a short-term antimicrobial solution, require cell uptake to disrupt protein synthesis, the bacterial membrane or metabolic pathways; all modes of action susceptible to drug resistance.[15] The shorter lifetime of these surfaces also preclude the release of non-lethal antimicrobial concentrations, which have been shown to actually enhance the horizontal gene transfer process by which microbiota acquire antibacterial resistance.[10,16]

Tethered or immobilized cationic biocides have been shown to have excellent antimicrobial efficacy in a variety of simulated environments.[17-20] This approach is advantageous as it greatly reduces initial microbial attachment via a mechanophysical mode of action, which has been hypothesized to function either through a long chain "polymeric spacer" effect, or by the charge-based "phospholipid sponge" effect.[18,21,22] While these immobilized cationic surface coatings have exceptional antimicrobial capacities, there are few examples of coatings that possess this property in conjunction with substantial durability to abrasion and other stressors, highlighting a limitation of these coatings.[23,24] Abrasion testing on antimicrobial coatings and materials has been limited,[25,28] and when applied, criteria for resistance to abrasion are varied. Without this capability, long term efficacy of these materials is less viable, a constraint compounded by the deactivation of cationic surfaces by bacterial debris.[27]

Rather than grafting cationic molecules to or from substrates to yield antimicrobial surfaces, Harney and coworkers carried out exploratory studies using cationic antimicrobial agents as additives in polymeric substrates.[28] This methodology is advantageous in its ability to load a high density of charged moieties throughout a plastic substrate; thus potential abrasion of the surface could expose more active, chemically bound surface-proximate antimicrobial. While an important initial step, the substrate scope tested by Harney et al. was limited to hydrophilic polyurethane resins, and migration to the polymer-air interface was said to be facilitated solely by the hydrophobic nature of the antimicrobials.[28] Extruded plastics with antimicrobial efficacies were reported by Efrati and coworkers, where the active antimicrobial agent was a blend of essential oils and ammonium functionalized-clay particulate.[29] These plastics demonstrated efficacy against E. coli, but no Gram-positive species were tested. Due to the biocide-release mechanism of these films, the coatings would likely not maintain significant long-term activity.

Currently, efforts to develop cationic antimicrobials have centered on the inclusion of ammonium groups to achieve the critical surface charge thought to be required for antimicrobial efficacy.[30-32] Less studied are phosphonium-containing counterparts, which are advantageous in that they have demonstrated excellent antimicrobial properties, low toxicity to mammalian cells, and higher thermal stability.[33-35] An essential requirement for antimicrobials to be used as plastic additives in high-temperature extrusion processes. Phosphonium-containing antimicrobial semi-interpenetrating polymeric networks were prepared by Cuthbert et al., though the networks were not covalently bound to the surface and antimicrobial assays were performed after removing the semi-interpenetrating polymer network (SIPN) from the substrate.[34] These materials demonstrate trialkyl phosphonium-containing macromolecules are viable as antimicrobial coatings.

SUMMARY

The present disclosure provides a class of small molecule, contact-active antimicrobial additives that can be effectively introduced at low loadings in thermoplastic substrates. In the process of developing the present disclosure, in was considered that the incorporation of an amphiphobic fluoroalkyl moiety would promote surface migration of these systems to the polymer-air interface. Of interest was the effect of perfluoroalkyl groups on the "amphiphilic balance" of the small-molecule additives, where carefully tailoring the proportion of cationic to hydrophobic moieties is a requirement for macromolecular antimicrobials to demonstrate biocidal selectivity of bacteria over mammalian cells.[36-38] Facilitating covalent attachment of these structures to the thermoplastic polymer lattice (FIG. 1.) was the incorporation of a UV-active benzophenone group into the molecular scaffold of the phosphoniums. In addition, the use of these small molecule phosphoniums as UV-cured coatings on polymer plastics was also explored, to increase the scope of applicability of this new class of antimicrobials.

The present disclosure provides a phosphonium compound having the following formula:

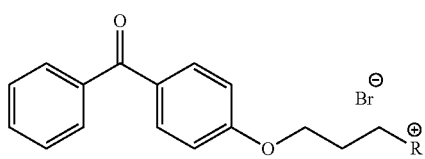

where R is a phosphine group substituted with alkyl, aryl, substituted alkyl, substituted aryl, heteroalkyl or any combination thereof. The alkyl has a general formula $C_nH_{2n+1}$ where n is an integer ranging between 1 and 18. The substituted alkyl has a general formula $C_NX_{2N+1}$ wherein X is hydrogen having one or more of substituents, and n is an integer ranging between 1 and 18. The substituents may comprise fluorine.

The substituted aryl may have substituents at any one, or more of, ortho, meta and para positions and substituents comprise an alkyl or a heteroalkyl, wherein the alkyl backbone is optionally substituted. In an embodiment, the alkyl backbone may be substituted with one or more fluorines.

The phosphine may be any one of (i), (ii), (iii), (iv) or (v):

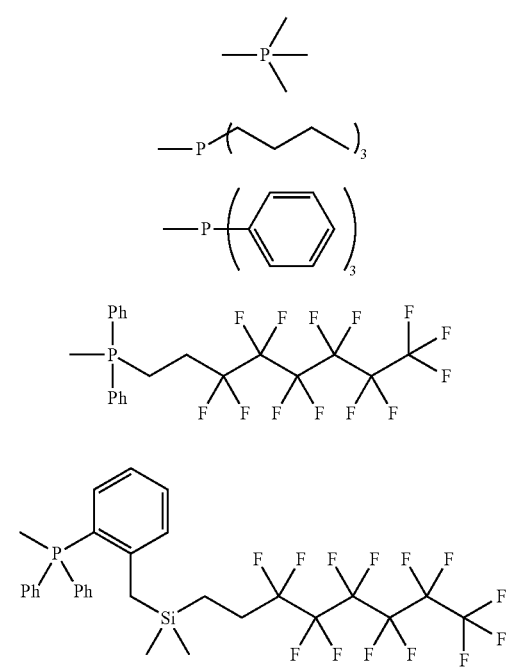

in which Ph is a phenyl ring.

When R is the tertiary phosphine (ii), and the phosphonium compound has the formula (2),

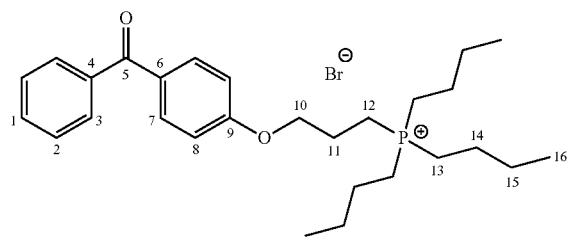

and compound (2) exhibits antimicrobial activity. Compound (2) may be combined as an additive with a polymer for forming an antimicrobial composite material. The polymer may be a thermoplastic polymer, and compound (2) is covalently bound to the thermoplastic polymer lattice. This antimicrobial composite material may be produced by coextruding the polymer with the phosphonium compound (2).

Alternatively compound (2) may be formulated as a UV-curable coating to be applied on a substrate surface, and the substrate can be a polymer plastic.

When R is the tertiary phosphine (iii), the phosphonium compound has the formula (3):

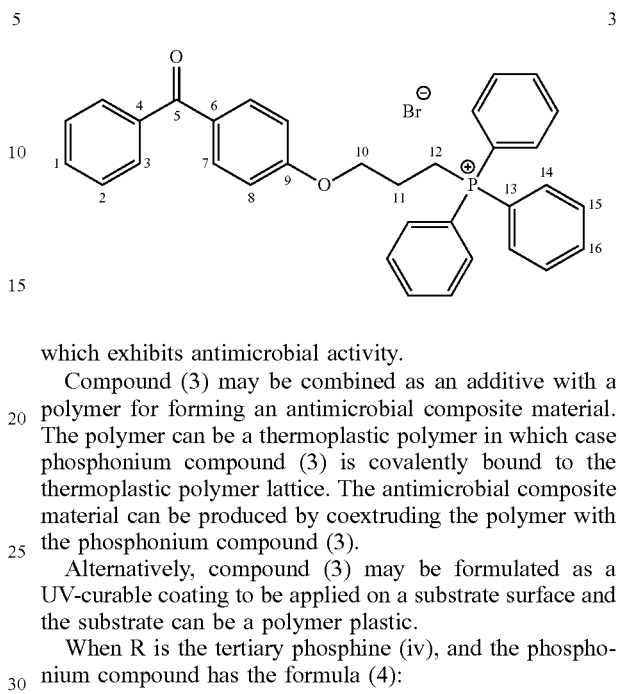

which exhibits antimicrobial activity.

Compound (3) may be combined as an additive with a polymer for forming an antimicrobial composite material. The polymer can be a thermoplastic polymer in which case phosphonium compound (3) is covalently bound to the thermoplastic polymer lattice. The antimicrobial composite material can be produced by coextruding the polymer with the phosphonium compound (3).

Alternatively, compound (3) may be formulated as a UV-curable coating to be applied on a substrate surface and the substrate can be a polymer plastic.

When R is the tertiary phosphine (iv), and the phosphonium compound has the formula (4):

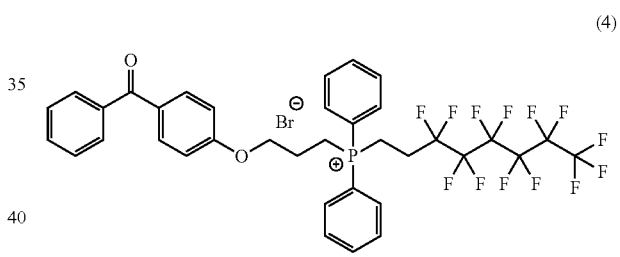

and this compound (4) exhibits antimicrobial activity. Compound (4) may be combined as an additive with a polymer for forming an antimicrobial composite material. The polymer may be a thermoplastic polymer where the phosphonium compound (4) is covalently attached to the thermoplastic polymer lattice. The antimicrobial composite material may be produced by coextruding the polymer with the phosphonium compound (4).

Alternatively compound (4) may be formulated as a UV-curable coating to be applied on a substrate surface, and the substrate may be a polymer plastic.

When R is the tertiary phosphine (i) such that the compound has the formula (1)

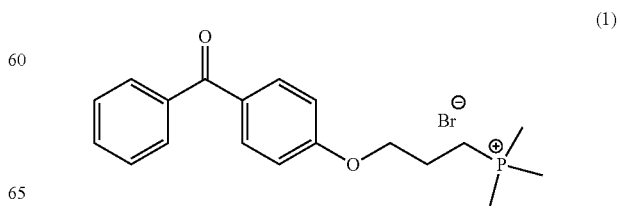

When R is the tertiary phosphine (v), and the compound has the formula (5).

Compound (5) is a fluorine containing substituted polyphosphonium antimicrobial. The presence of the fluorine substituents in the structure encourage migration to the upper layer of a plastic if injection molded and provide high water contact angles at the surface.

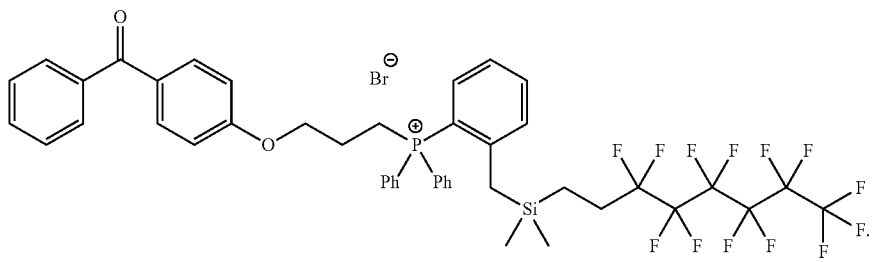

(5)

A further understanding of the functional and advantageous aspects of the disclosure can be realized by reference to the following detailed description and drawings.

BRIEF DESCRIPTION OF THE DRAWINGS

Preferred embodiments of the disclosure will now be described, by way of example only, with reference to the drawings, in which:

FIG. 2A shows an atomic force microscopy (AFM) image and corresponding water contact angle image and values of untreated PC plastic;

FIG. 2B shows an AFM image and corresponding water contact angle image and values of PC plastic coated with tributylphosphonium 2;

FIG. 2C shows an AFM image and corresponding water contact angle image and values of PC plastic treated with triphenylphoshonium 3;

FIG. 2D shows an AFM image and corresponding water contact angle image and values of PC plastic treated with perfluoroalkylphosphonium 4; and FIG. 2E is a Table showing thickness and roughness values for each PC surface coating. Thickness measurements were taken at three points along the separation line of the half-coated sample.

FIG. 6A to 6D show XPS analysis of co-extruded polypropylene plastics, in which:

FIG. 6A shows a schematic of the XPS depth profiling experiment, where pieces were abraded with a microtome to create step heights;

FIG. 6B shows XPS peak analysis of P 2p peak for a control virgin extruded PP at different step heights;

FIG. 6C shows XPS peak analysis of P 2p peak for PP-2 at different step heights; and FIG. 6D shows XPS peak analysis of P 2p peak for PP-4 at different step heights.

FIG. 7A shows the average cell viability of $Arthrobacter$ on (from left) control extruded polypropylene, PP-2, PP-3, and PP-4;

FIG. 7B shows the average cell viability of $E.\ coli$ on (from left) control extruded polypropylene, PP-2, PP-3, and PP-4;

FIG. 7C shows the average cell viability of $Arthrobacter$ as per FIG. 7A on the polypropylene pieces after 100 cycles of solvent rub abrasion; and FIG. 7D shows the average cell viability of $E.\ coli$ as per FIG. 7B on the polypropylene pieces after 100 cycles of solvent rub abrasion.

DETAILED DESCRIPTION

Figure 1:
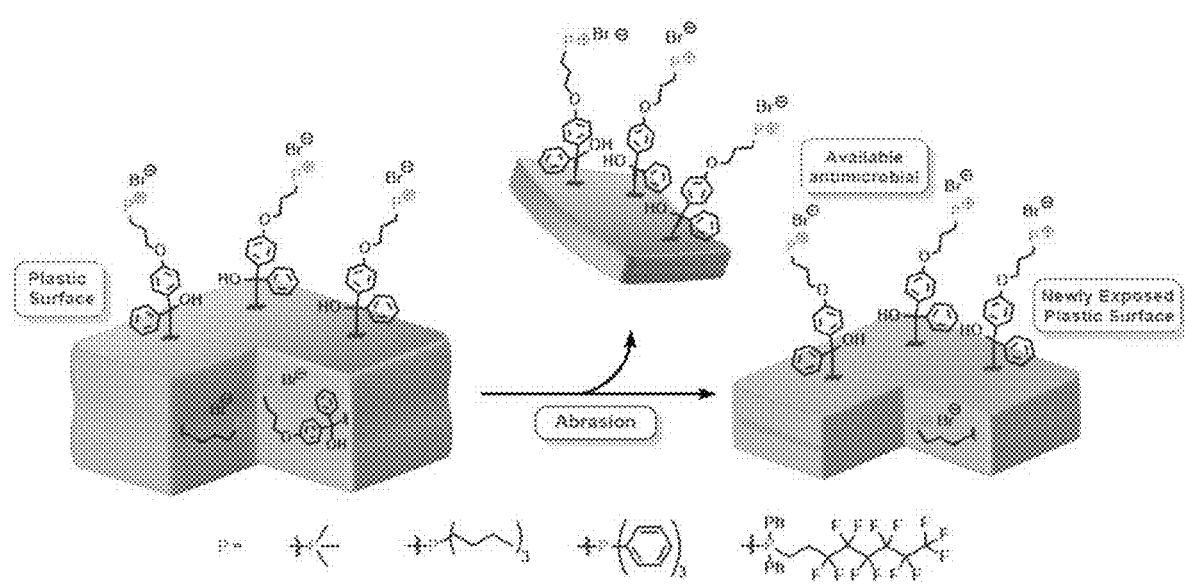
FIG. 1 is a schematic showing a cross section of antimicrobial-enriched plastic with sub-surface phosphonium, which upon abrasion is exposed and available to combat microbial growth.

Various embodiments and aspects of the disclosure will be described with reference to details discussed below. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

Some of the Figures may not be to scale and some features may be exaggerated or minimized to show details of particular elements while related elements may have been eliminated to prevent obscuring novel aspects. Therefore, specific structural and functional details disclosed herein are not to be interpreted as limiting but merely as a basis for the claims and as a representative basis for teaching one skilled in the art to variously employ the present disclosure.

As used herein, the terms "comprises", "comprising", "includes" and "including" are to be construed as being inclusive and open ended, and not exclusive. Specifically, when used in this specification including claims, the terms "comprises", "comprising", "includes" and "including" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately" are meant to cover variations that may exist in the upper and lower limits of the ranges of values, such as variations in properties, parameters, and dimensions. Unless otherwise specified, the terms "about" and "approximately" mean plus or minus 25 percent or less.

It is to be understood that unless otherwise specified, any specified range or group is as a shorthand way of referring to each and every member of a range or group individually, as well as each and every possible sub-range or sub-group encompassed therein and similarly with respect to any sub-ranges or sub-groups therein. Unless otherwise specified, the present disclosure relates to and explicitly incorporates each and every specific member and combination of sub-ranges or sub-groups.

As used herein, the term "on the order of", when used in conjunction with a quantity or parameter, refers to a range spanning approximately one tenth to ten times the stated quantity or parameter.

The attachment and proliferation of antibiotic resistant, biofilm-forming bacteria to oft-handled material surfaces has emerged as a growing concern, particularly in the biomedical, healthcare and food packaging industries. This ongoing threat has necessitated a preventative approach to combat the proliferation of biofilm forming-bacteria, and the development of both biocide-releasing and tethered, immobilized biocide surface coatings to meet this demand. While these surface coatings have demonstrated excellent antimicrobial efficacy, there are few examples of antimicrobial surfaces with long-term durability and efficacy. To that end, UV-curable phosphoniums bearing benzophenone anchors were synthesized with a variety of alkyl, aryl, and fluoroalkyl functional groups at phosphorus to probe their efficacy as thermally stable antimicrobial additives in plastics or as surface coatings. The surface topology and characteristics of these materials were studied to gain insight into the mechanism of antimicrobial activity of these materials. Additionally, general design principals for tailoring phosphoniums to function as both additives during injection molding processes and as UV-curable coatings are described, and evaluation against both gram negative and gram-positive bacteria in both applications with a variety of plastics were carried out. Crucially, the materials maintained the ability to kill biofilm-forming bacteria even after being subject to abrasion processes, demonstrating the potential to serve as long-term antimicrobial materials.

The following non-limiting examples will illustrate the present disclosure, and it will be understood that these are exemplary in nature, and that the present disclosure is not intended to be limited by these specific examples. Disclosed below are five (5) new molecules.

Results and Discussion

Synthesis of Phosphonium Small Molecule Additives

The precursor 4-(3-bromopropyoxy)benzophenone was synthesized according to published work and NMR spectra ($^1$H and $^{13}$C) corresponded well with previously published data.[13]

Typical extrusion or additive manufacturing processes require high temperatures, and as such phosphonium materials predicted to have good thermal stability were synthesized. The methyl, n-butyl, phenyl, and fluoroalkyl substituents on the phosphoniums (1, 2, 3, and 4) were chosen to represent varying degrees of hydrophobicity, oleophobicity, steric bulk, and chain length about the phosphonium moiety. Compounds 1-4 were synthesized in good yields utilizing a simple Menshutkin-type quaternization procedure with the 4-(bromopropoxy)benzophenone (Scheme 1).

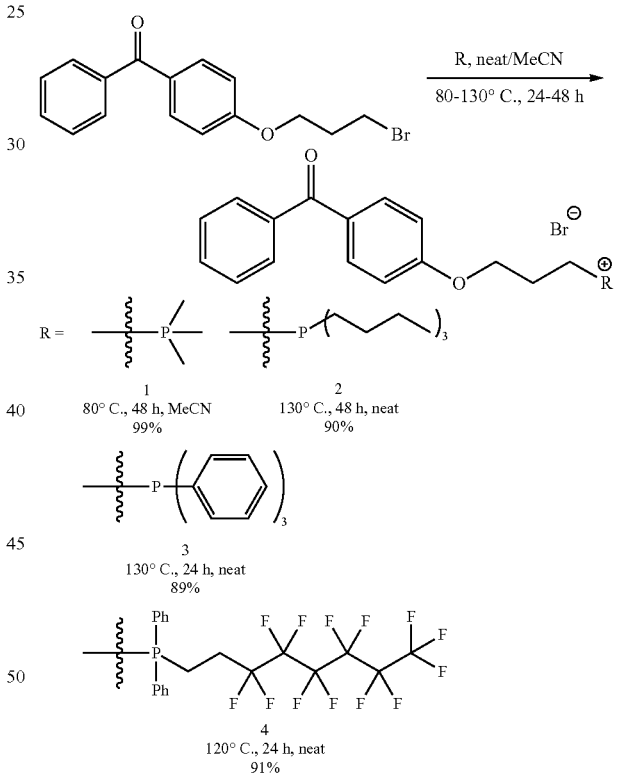

Incorporated into phosphonium 4 was a $C_6F_{13}$ fluoroalkyl chain, which required preparation of a tertiary perfluoroalkyl diphenyl phosphine precursor. The phosphine was prepared via a hydrophosphination reaction with diphenylphosphine and perfluorohexylethylene using 4 mol % AIBN in THF. This selectively performed P—H addition across the fluoroolefin at the anti-Markovnikov position. Under an atmosphere of Ar (g), the resulting product had oxidized to the non-nucleophilic P(V) species. While the hydrophosphination product was only isolated as the oxide, reduction of the oxide with a large excess of trichlorosilane was successful in obtaining the P(III) species in good yield. Susceptibility to oxidation in air has been observed for fluoroalkyl phosphines with $(CH_2)_x$ spacers.[40,41] In this work, the use of the perfluorocarbon reactants, which are known to have a significantly greater potential to solubilize molecular oxygen than non-fluorinated counterparts, may be responsible for the observed oxidation.

UV-Initiated Grafting of Phosphonium Coatings to Plastic Surfaces

The incorporation of the UV-active benzophenone functionality allows for this class of phosphoniums to be applied both as UV-immobilized surface-active additives, and as non-leaching, tethered coatings. Immobilized phosphonium-containing coatings on polymer plastic substrates were prepared by dissolving phosphoniums 1, 2, 3, or 4 at 1% (w/v) in a solution of 95% EtOH. The solutions were spray coated onto plastic and cured using UVA (~360 nm) light with a measured dosage strength of ca. 0.16 W/cm² for 1 min. Each small molecule phosphonium containing either aliphatic or aromatic groups cured onto the surface well and evidence of their presence was visualized qualitatively by staining the polystyrene plastic pieces using the anionic dye bromophenol blue, as detailed previously.[13] Surface charge analysis of these coatings (Table 1) indicated each of the phosphonium-based coatings on the PS substrate had a measured surface charge density on the order of $10^{15}$ $[P^+]$ $cm^{-2}$, within the same magnitude of charge densities measured for analogous small molecule ammonium-based coatings.[13,30]

Charge measurements for coatings comprising 2 and 3 were within the proposed charge density threshold (3.89× $10^{15}$ and $2.90 \times 10^{15} [P^+]$ $cm^{-2}$, respectively) for antimicrobial efficacy against biofilm forming bacteria. Interestingly, despite deploying identical coating and curing conditions to other phosphonium small molecules, the surface charge measurement for the PMe₃ analogue 1 was $1.60 \times 10^{15} [P^+]$ $cm^{-2}$, outside of the range established independently by Murata and Kügler.[30,31] PS coated with 4 possessed significant surface charge density ($2.95 \times 10^{15} [P^+]$ $cm^{-2}$), indicating phosphonium charges were still accessible despite the incorporation of a large fluoroalkyl group.

TABLE 1

Advancing contact angle measurements and surface charge density of UV cured phosphonium coatings and plastics co-extruded with phosphoniums

| Material | $\theta_c^a$ (deg) | Surface charge density[a] ($[P^+]$ $cm^{-2}$) |
|---|---|---|
| Polystyrene control | 92.2 ± 1.0 | N/A |
| Polystyrene coated with 1 | 71.9 ± 5.1 | (1.60 ± 0.03) × $10^{15}$ |
| Polystyrene coated with 2 | 36.4 ± 11.0 | (3.89 ± 0.50) × $10^{15}$ |
| Polystyrene coated with 3 | 63.5 ± 5.8 | (2.90 ± 0.20) × $10^{15}$ |
| Polystyrene coated with 4 | 68.0 ± 2.0 | (2.95 ± 0.05) × $10^{15}$ |
| Molded polystyrene control | 87.8 ± 5.1 | N/A |
| PP-2 Molded PP co-extruded with 2 | 74.1 ± 2.4 | |
| PP-3 Molded PP co-extruded with 3 | 80.5 ± 0.5 | |
| PP-4 Molded PP co-extruded with 4 | 78.8 ± 5.0 | |

[a]All measurements were performed in triplicate.

Advancing water contact angle ($\theta_C$) measurements were performed on the coated pieces to further probe the relationship between the structure of the phosphonium small molecules coated on the substrate and their macroscopic properties as coatings. Measurements for $\theta_C$ trend with charge density results (Table 1). The relatively low density of accessible charge and high $\theta_C$ of 1 is surprising, as networks formed upon UV-curing the PMe₃ derivative 1 could be expected to exhibit similar or higher hydrophilicity than networks with n-butyl (2) and phenyl (3) structures that have larger hydrophobic cross sections, as has been observed in similar systems.[34]

More dramatic decreases in $\theta_C$ were observed for PS coated with phosphonium 2 and 3, in correlation with their higher surface charge densities, exhibiting $\theta_C$ of 36.4±11.0° and 63.5±5.8° respectively. Coatings of fluoroalkyl containing phosphonium 4 had slightly increased hydrophobicity relative to known phosphonium and ammonium coatings,[30,34] however, the coating maintained a hydrophilic contact angle ($\theta_C$=68.0±2.0).

The incorporation of a fluoroalkyl group about the charged phosphonium did not significantly alter the hydrophilicity of the coating, a property thought to be a factor in mechanism of kill for antimicrobial coatings.[42,43] With respect to one another, nonpolar n-butyl (2) and phenyl (3) substituents can be expected to have similar effects on coating hydrophilicity.[44-46]

To that end, AFM was used to probe the surface topography of the cured coatings, and explore whether roughness was responsible for inducing increased wettability with the results shown in FIGS. 2A to 2E.

Polycarbonate (PC) plastic was used as a model substrate due to the material's relative smoothness when compared to the polypropylene and polystyrene samples available, allowing for greater clarity in accessing the coating properties. Previous studies carried out by our group have shown that antimicrobial activity of UV-curable benzophenone-anchored coatings is independent of the plastic substrate.[13] FIG. 2A shows the atomic force microscopy (AFM) image and corresponding water contact angle image and values of untreated PC plastic. FIG. 2B shows the AFM image and corresponding water contact angle image and values of PC plastic coated with phosphonium 2. FIG. 2C shows an AFM image and corresponding water contact angle image and values of PC plastic treated with phosphonium 3 while FIG. 2D shows the AFM image and corresponding water contact angle image and values of PC plastic treated with perfluoroalkylphosphonium 4. The Table shown in FIG. 2E shows the thickness and roughness values for each PC surface coating. Thickness measurements were taken at three points along the separation line of the half-coated sample.

Plastic substrates coated with phosphonium 2 produced a coating with an average thickness of 47 nm (±11 nm) with a root mean square (RMS) roughness value of 56 nm, a 42% increase over the roughness value measured for UV-cured spray coatings of the PPh₃ containing phosphonium 3. Despite identical spray coating parameters, substrates coated with phosphonium 3 had nearly double the average thickness (95±38 nm) compared to phosphonium 2, suggesting the morphology of the coating is highly dependent on the phosphonium "tail" groups. Increased roughness may also be linked to the higher surface charge measurements observed for coatings of phosphonium 2; surface area accessible to the AFM instrument can be thought of analogous to surface area accessible to the fluorescein dye, as both tests probe the surface at the molecular level. The thicker, but smoother, coatings of phosphonium 3 may have fewer phosphonium molecules accessible to the fluorescein dye due to lower roughness. Surfaces coated with phosphonium 4 had an average thickness (106±14 nm) and roughness value (35 nm) to phosphonium 3. Interestingly, both coatings possessed pore-like microstructures, with the indentations ranging in size between 290 and 180 nm in diameter and in depth from 80 to 44 nm. To the best of our knowledge, this is a unique observation for small molecule-based coatings.

The similarities between the two coatings indicate that the introduction of the fluoroalkyl moiety about phosphonium 4 does not yield significant differences in coating thickness and roughness, and suggests that the phenyl substituents are dominant in governing these properties for the UV-cured coatings prepared. The roughness values align with the observed differences in $\theta_C$, with the rougher surface of phosphonium 2 also displaying a lower contact angle compared to the relatively smoother surfaces comprising coatings of phosphonium 3 and 4.

Antimicrobial Efficacy of Phosphonium Coatings

To establish the antimicrobial efficacy of the novel small molecule phosphonium-based coatings, treated plastic pieces with were subjected to the large drop inoculum (LDI) test method previously reported by Ronan et al.[47] This method has been shown to be critical for determining how antimicrobial coatings function in simulated solid-air interface environments that more closely resemble the real-world phenomenon of desiccation, to which biofilm-forming bacteria are commonly subjected.[13,20,47] A large droplet with a known quantity of viable bacterial cells was deposited on the test surfaces, allowing for desiccation of the cells on the test surface, providing biofilm-forming conditions at the solid/air interface.[48]

Figure 3A:
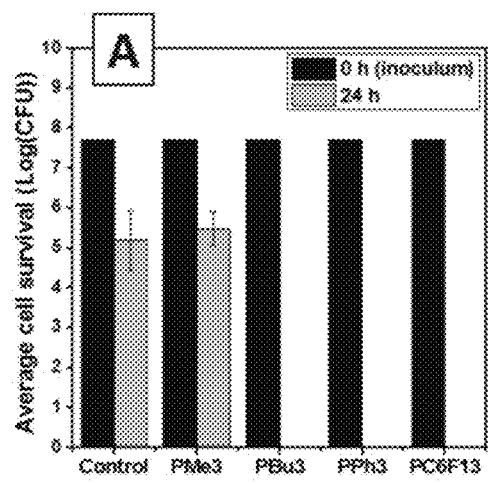
FIG. 3A are histograms of Average cell survival (Log (CFU)) showing average cell survivability of: $E.\ coli$ (ATCC strain 11229) against (from left) uncoated PS, $(PMe_3)$ 1, $(P(n-Bu)_3)$ 2, $(PPh_3)$ 3, and $(P(Ph)_2C_2H_4C_6F_{13})$ 4. All testing was performed in triplicate. The measurement at 0 h was the initial bacterial load placed on the sample.
Figure 3B:
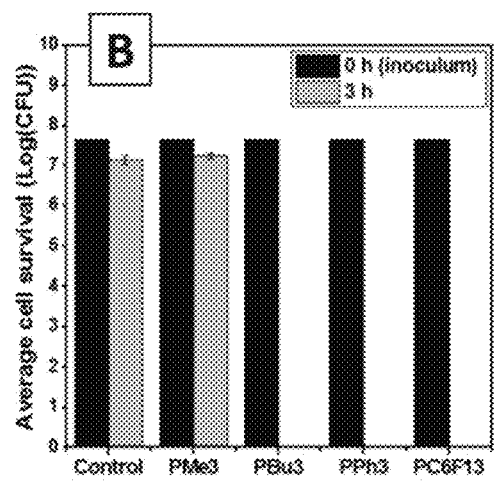
FIG. 3B are histograms of Average cell survival (Log (CFU)) showing average cell survivability of: $Arthrobacter$ sp. (IAI-3) against (from left) uncoated PS, $(PMe_3)$ 1, $(P(n-Bu)_3)$ 2, $(PPh_3)$ 3, and $(P(Ph)_2C_2H_4C_6F_{13})$ 4. All testing was performed in triplicate. The measurement at 0 h was the initial bacterial load placed on the sample.

To guarantee all inoculated cells enter into contact with the test surface, the samples with the droplet are subjected to a standardized 3 h drying period. The cells are then recovered, serially diluted, plated out onto tryptic soy agar, and enumerated to assess the extent of cell survival and thus antimicrobial efficacy of the test surfaces. *Arthrobacter* (IAI-3) and *E. coli* (ATCC strain 11229) were chosen as representative Gram-positive and Gram-negative bacterial strains. *Arthrobacter sp.* was used as a representative member of the indoor airborne flora continuously deposited on surfaces; they have been shown to be vital for the survival and proliferation of multi-bacterial biofilms as a result of their high tolerance for dessication.[47,48] Polystyrene plastic coated with phosphoniums 2, 3, and 4 exhibited full reductions of viable Gram-negative *E. coli* cells (FIG. 3A) and Gram-positive *Arthrobacter* (FIG. 3B) after 24 and 3 hours in contact with the surface, respectively.

These coatings had significant densities of charged phosphonium, and as such, efficacy against both bacterial cell membrane types is predicted by the phospholipid sponge theory, which supposes a density of charge is the key requirement for deterioration of the membrane.[32] From these results, no threshold for the roughness and thickness of these phosphonium coatings at which antimicrobial efficacy begins to diminish was established, with only the surface charge-deficient 1 failing to reduce bacterial survivability, further supporting evidence for a charge density threshold, as these coatings had lower quantity of accessible charge as well as a lower contact angle (Table 1).

Co-Extrusion of Phosphonium-Containing Plastics

While standard antimicrobial coatings are susceptible to abrasion and deactivation by bacterial debris,[27] it was hypothesized that the incorporation of phosphoniums 2, 3, and 4 into the bulk polypropylene (PP) plastic would provide subsurface concentration of active antimicrobial tethered to the substrate, endowing the materials with antimicrobial longevity. Due to a lack of observed antimicrobial activity from LDI testing on phosphonium 1, further experiments using the molecule were not pursued. The materials were fabricated by co-extrusion of the phosphoniums with polypropylene (PP). Of interest was the relative ability of each phosphonium to self-concentrate at the solid-air interface, effectively forming a concentration gradient of the active antimicrobial at the surface.

Figure 4:
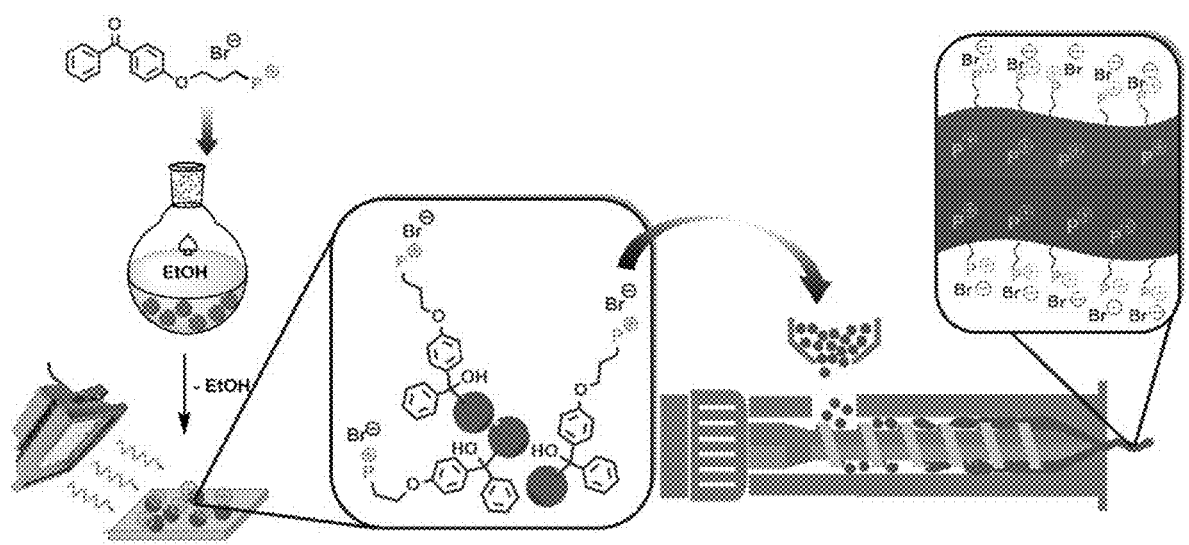
FIG. 4 is an illustration showing the experimental concept for the co-extrusion of polypropylene with phosphonium small molecules to yield plastics with antimicrobial-enriched surfaces.

FIG. 4 is an illustration showing the experimental concept for the co-extrusion of polypropylene with phosphonium small molecules to yield plastics with antimicrobial-enriched surfaces. Phosphoniums 2, 3, and 4 were dissolved at 1% (w/w) in minimal EtOH, and PP beads were added to the solution. Rotary evaporation of the solvent gave an even coating of the phosphoniums on the plastic. Initial attempts to fabricate plastics with immobilized antimicrobials used a post-extrusion UV-cure step to covalently link the benzophenone-containing phosphonium to the plastic polymer network. Despite this, when placed in an aqueous solution, a small concentration of phosphonium was visible in the solution by UV-leachate analysis.

Figure 8A:
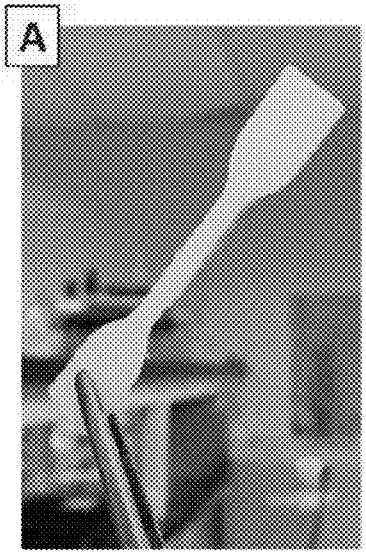
FIG. 8A shows a a molded PP pieces containing virgin polypropylene beads.
Figure 8B:
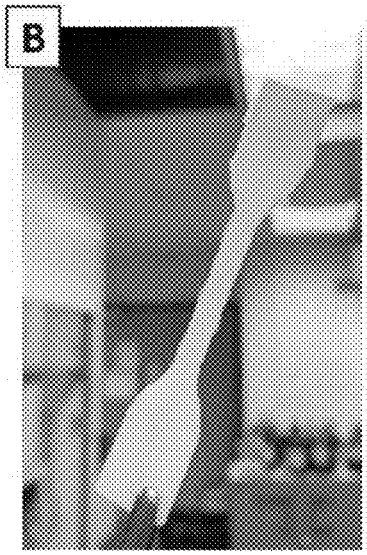
FIG. 8B Shows cured PP with 1.5 (w/w) % of 3 (PP-3) with a slight off-white coloration.

Thus, after the coating step, a pre-extrusion UV-cure process was introduced to immobilize the phosphoniums to the plastic bead surface. Extrusion of these pre-cured beads at 220° C. into a mold pre-heated to 100° C. yielded the tributylphosphonium-containing plastic PP-2, triphenylphosphonium-containing PP-3, (FIG. 8) and perfluoroalkylphosphonium-containing PP-4 as off-white coloured "dogbone" pieces. The discoloration was due to the amber or off-white natural coloring of the phosphoniums added to the melt, and not UV or heat exposure. The effect of incorporating each phosphonium at 1% was quantified by advancing WCA (Table 1). Relative to virgin molded PP pieces, pieces containing phosphoniums 2-4 exhibited modest decreases in contact angle (Table 1), indicating that while present at the plastic-air interface, there was a lower density of accessible phosphonium charge at the extruded plastic surface in comparison to the UV-cured surface coatings as a distribution of phosphonium small molecules were subsurface or in the bulk thermoplastic scaffold. FIG. 1 is a schematic illustration showing a cross section of antimicrobial-enriched plastic with sub-surface phosphonium, which upon abrasion is exposed and available to combat microbial growth.

Figures 5A, 5B:
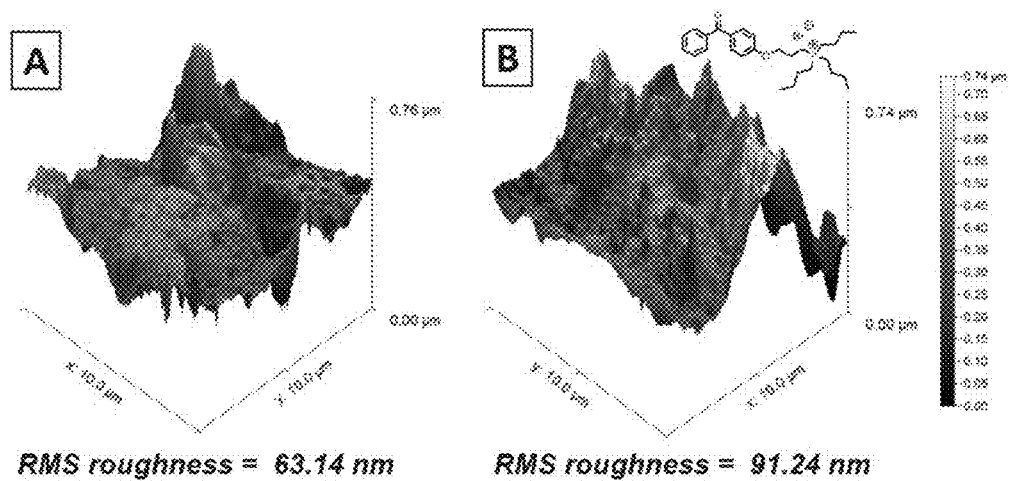
FIG. 5A shows processed AFM images of Virgin molded PP pieces.
FIG. 5B shows processed AFM images of Virgin molded PP-2.

Atomic force microscopy (AFM) analysis was carried out on the molded plastics to examine whether incorporation of the phosphonium antimicrobial resulted in changes to the surface microstructure. A control molded sample (see FIG. 5A) and PP-2 (FIG. 5B) were selected for analysis to obtain representative structural data on the phosphonium containing plastics. The phosphonium-containing surface did not have significant structural differences on the micron scale, as both extruded surfaces had much larger peaks and valleys than the coated PC substrates Roughness values were also much higher, while the PP-2 plastic had a substantial increase in roughness (91.24 nm) relative to the control surface (63.24 nm). Due to the nature of the extrusion process and the removal of the piece from the stainless-steel mold, higher roughness values could be expected.

Evaluation of Phosphonium Content in Polypropylene Co-Extruded with Antimicrobials X-ray photoelectron spectroscopy (XPS) was employed to probe the phosphonium content at the surface of materials co-extruded with phosphoniums 2 and 4, providing a representative depth profile of phosphonium content within the molded plastic. Small slices (surface, 100 µm, 300 µm, and 500 µm) of the material were taken, and XPS measurements were carried out at each depth (FIG. 6). At the plastic-air interface there was a prominent peak at a binding energy of 132.9 eV, corresponding to the P 2p peak found in similar cationic phosphonium systems.[49] Elemental analysis obtained via XPS of PP-2 (Table 2) showed 1.31% P at the surface, corresponding closely with the ratio of P in the chemical composition of 2 (1.37%), and indicating these co-extruded materials had significant accessible phosphonium charge. Of interest was the subsurface concentration of phosphonium in the molded pieces, as an active layer of phosphonium tethered to the thermoplastic scaffold can allow access to long-term antimicrobial plastics.

TABLE 2

Elemental analysis of PP-2 by XPS at different depths.

| | Depth (μm) | | | |
|---|---|---|---|---|
| Element | 0 (Surface) | 100 | 300 | 500 |
| | Atomic % | | | |
| C | 81.43 | 99.02 | 98.69 | 97.87 |
| O | 12.55 | 0.82 | 1.03 | 1.70 |
| P | 1.31 | 0.15 | 0.18 | 0.26 |
| Ca | 0.73 | 0.00 | 0.00 | 0.00 |
| N | 0.60 | 0.00 | 0.09 | 0.16 |
| Si | 2.39 | 0.00 | 0.00 | 0.00 |
| Br | 0.99 | 0.00 | 0.00 | 0.00 |

Figure 6A:
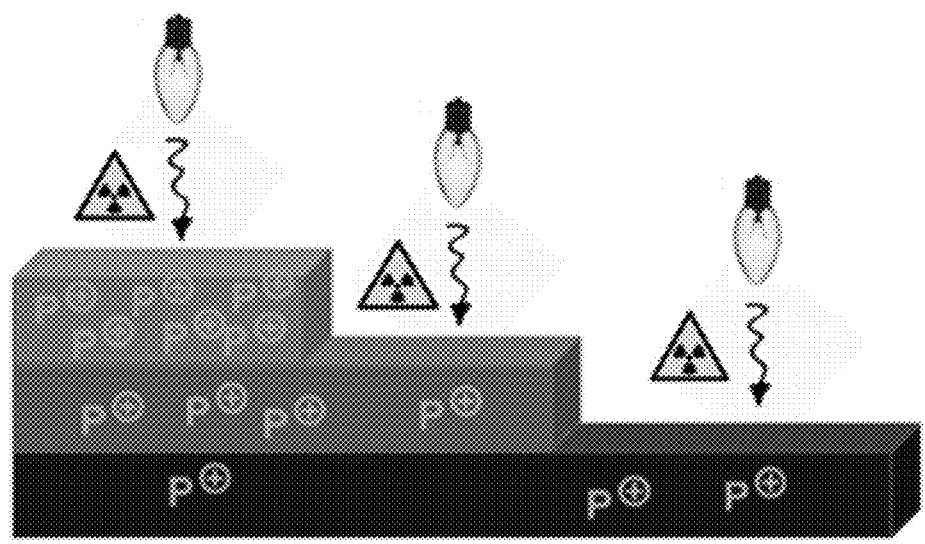
Figure 6B:
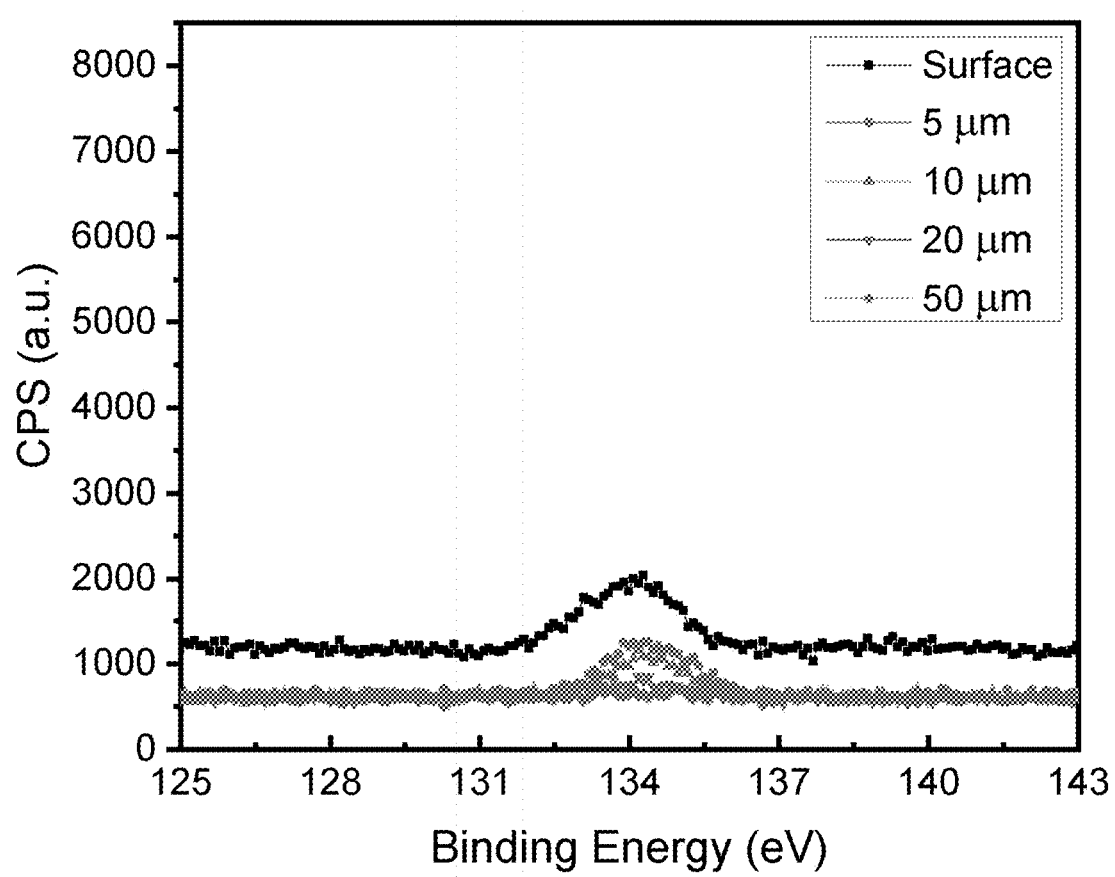
Figure 6C:
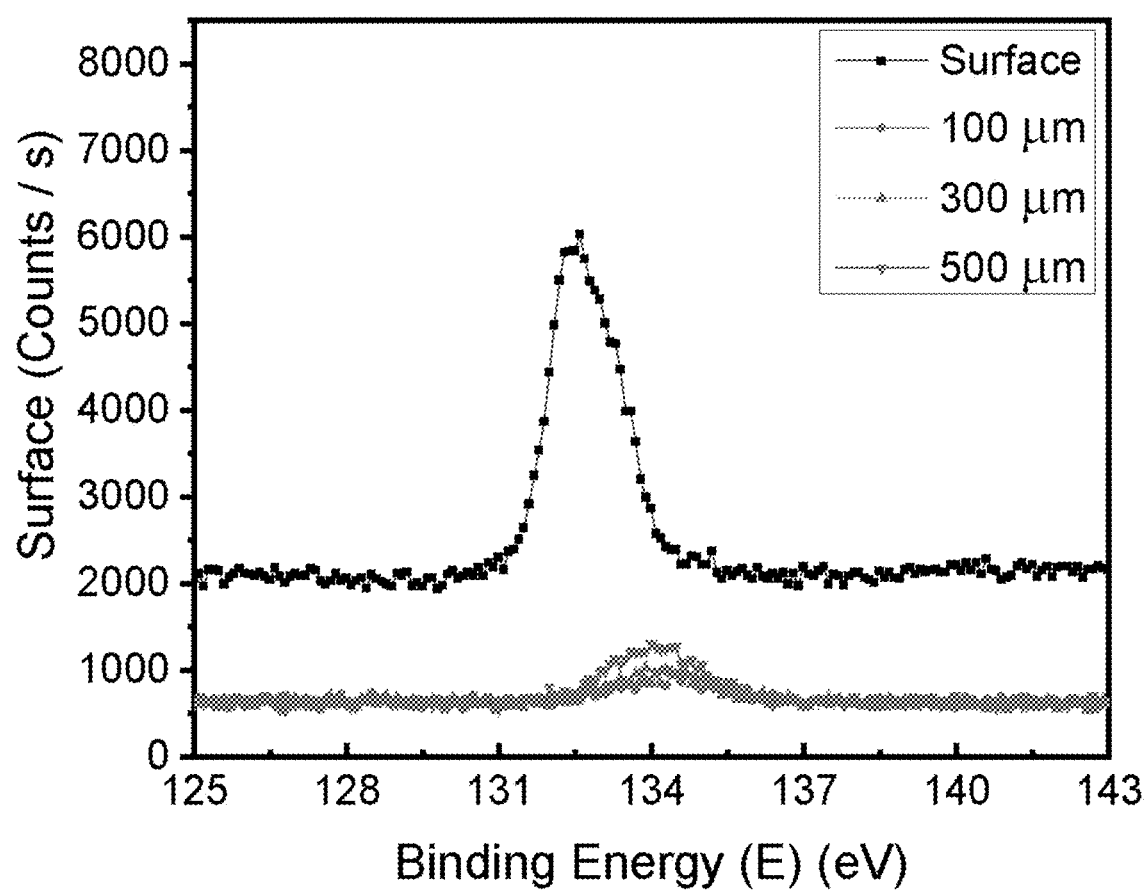
Figure 6D:
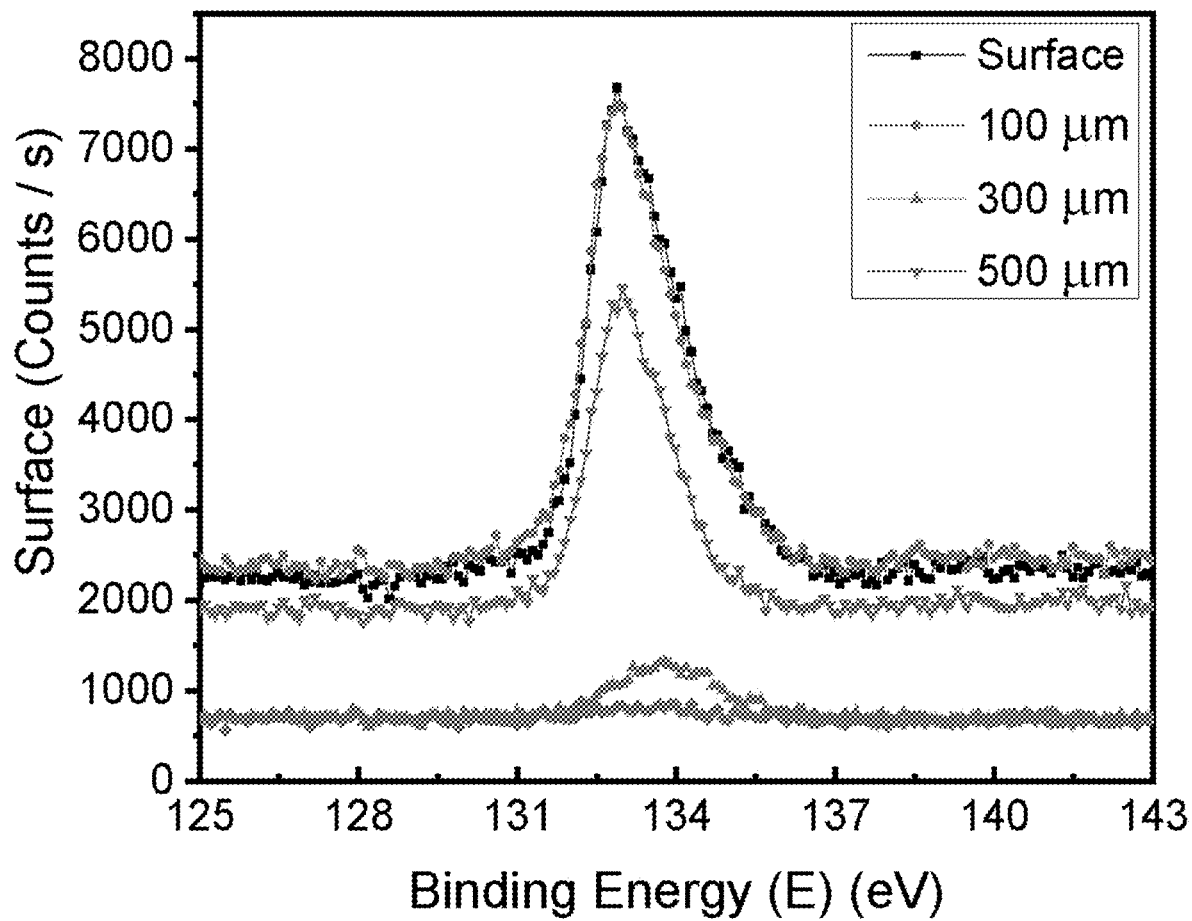

FIG. 6A to 6D show XPS analysis of co-extruded polypropylene plastics. FIG. 6A shows a schematic of the XPS depth profiling experiment, where pieces were abraded with a microtome to create the step heights. FIG. 6B shows XPS peak analysis of P 2p peak for a control virgin extruded PP at different step heights. FIG. 6C shows XPS peak analysis of P 2p peak for PP-2 at different step heights. FIG. 6D shows XPS peak analysis of P 2p peak for PP-4 at different step heights. Analysis of the characteristic P 2p signal was obtained from XPS measurements taken 100 μm from the surface of PP-2, and showed a dramatic decrease in phosphorus to 0.26%. The low loading of phosphonium at this depth indicates tributylphosphonium 2 preferentially migrates to the plastic-air interface rather than remain in the bulk plastic. Further analysis at 300 μm and 500 μm showed similar phosphorus content (0.15% and 0.18%, respectively). Slices for the depth profile analysis were taken at different locations horizontally across the molded plastic piece (FIG. 6A), and the observed differences in atomic P % across the sample between the 300 and 500 μm slices may be a result of non-uniformity in phosphorus content laterally across the sample. Due to the lack of an observed concentration gradient in PP-2 (FIG. 6C), XPS analysis measurements for P % in PP-4 were taken at shallower step heights (surface, 5 μm, 10 μm, 20 μm and 50 μm). A control sample was also prepared and analyzed. Peak analysis was done on the P 2p signal in each XPS spectrum (FIG. 6C). The peak intensity was sustained from the surface to the 5 μm step height, while at 10 μm there was a significant drop off. At 20 μm however, an increased response was observed; providing further evidence for non-uniformity across the sample. Elemental analysis performed on the XPS data (Table 3) showed significant P present at the surface (2.01%), a significant increase over the amounts present at the surface of PP-2, and an atomic % of P greater than a single molecule of 4 (1.22%). This suggests the quantities of phosphonium 4 migrating to the surface is greater than one molecule per area unit surveyed in the XPS scan.

TABLE 3

Elemental analysis of PP-4 by XPS at different depths.

| | Depth (μm) | | | | |
|---|---|---|---|---|---|
| Element | 0 (Surface) | 5 | 10 | 20 | 50 |
| | Atomic % | | | | |
| C | 71.01 | 75.82 | 97.3 | 82.21 | 98.79 |
| O | 7.63 | 6.53 | 1.54 | 3.79 | 0.47 |
| F | 16.95 | 14.09 | 0.44 | 11.63 | 0.33 |
| P | 2.01 | 1.83 | 0.32 | 1.16 | 0.12 |
| N | 0.47 | 0.41 | 0.31 | 0.27 | 0.19 |
| S | 0.07 | 0.00 | 0.09 | 0.00 | 0.00 |
| Si | 0.71 | 0.32 | 0.05 | 0.18 | 0.07 |
| Br | 1.55 | 1.01 | 0.04 | 0.77 | 0.03 |

A large quantity of F (16.95% atomic composition) at the surface was also indicative of surface migration of phosphonium 4. Crucially, the subsurface levels of P at 5 μm were also substantial (1.83%), with a decrease of only 0.18% compared to the surface. Phosphonium content was diminished greatly at 10 μm, but at 20 μm the atomic % of P was nearly equal to the ratio of P in the molecule, representing a quantity similar to that of a monolayer. These results suggest there is a significant proportion of charge at subsurface levels, endowing the materials with the potential to maintain killing abilities after surface abrasion.

Antimicrobial Efficacy and Abrasion Resistance of Plastics Co-Extruded with Phosphonium FIGS. 7A to 7D show the results of viability studies in which FIG. 7A shows the average cell viability of *Arthrobacter* on (from left) control extruded polypropylene, PP-2, PP-3, and PP-4. FIG. 7B shows the average cell viability of *E. coli* on (from left) control extruded polypropylene, PP-2, PP-3, and PP-4. FIG. 7C shows the average cell viability of *Arthrobacter* as per FIG. 7A on the polypropylene pieces after 100 cycles of solvent rub abrasion, while FIG. 7D shows the average cell viability of *E. coli* as per FIG. 7B on the polypropylene pieces after 100 cycles of solvent rub abrasion.

A significant challenge to the plastics coextruded with the phosphonium antimicrobials is having sufficient concentration of the active phosphonium at the surface-air interface to effectively kill bacteria. As mentioned above, XPS analysis of PP-2 and PP-4 and showed the bound phosphoniums synthesized and studied could self-segregate to the plastic-air interface. FIGS. 7A and 7C presents the results of the LDI test method for PP-2, PP-3 and PP-4 against *Arthrobacter* and *E. coli*. After extrusion and exhaustive washing of the surface with distilled water, the molded pieces exhibited full log reduction of the Gram-negative *E. coli* (FIG. 7A) and the Gram-positive *Arthrobacter* species after 24 and 3 h, respectively, indicating the pieces had bactericidal concentrations of phosphonium at the surface despite the higher contact angles relative to their UV-cured coating counterparts. In this instance of PP-2, these results indicate a surface P content of 1.31% (as measured by XPS, Table 2) is a high enough concentration of phosphonium to render that surface bactericidal. *E. coli* subjected to control polypropylene samples extruded without phosphonium did experience some die off after 24 h; this reduction is likely due to desiccation-related cell death, a phenomenon observed for *E. coli* used during the LDI protocol.[20]

The efficacy of these materials against the representative strains of Gram-negative and Gram-positive bacteria lead us to probe the antimicrobial capability of these materials after being subject to abrasive processes, to determine whether tethered sub-surface phosphonium observed by XPS can translate to materials with antimicrobial properties after the surface has be abraded. The process of using an aqueous solution to wipe or rub away dirt or bacteria is one fundamental to sanitation,[50] and as such the solvent double rub protocol described in ASTM D5402[51] was chosen as a representative test of durability. Water was chosen as the solvent due to its ubiquity in cleaning solutions. The same extruded polypropylene samples subjected to the LDI were first rinsed with copious amounts of sterile distilled water, then vortexed for 5 minutes in saline to remove any bacterial debris from the initial test. After another rinse step, the pieces were subjected to 100 solvent double rubs on the tested side using a cotton cloth saturated with distilled water, the amount of force of each rub measured to be between 1000 g and 1600 g. After 100 double rubs, the pieces were rinsed, sterilized under UV light, and the abraded sides were subject to another loading of bacteria.

Plastics tested against *E. coli* were successful in inhibiting all bacterial cell growth initially and were subjected to the solvent double rub test for 100 cycles. Abraded PP-2 exhibited low average reductions of log 0.81 CFU, while abraded PP-3 killed all the Gram-negative species inoculated onto the surface. The reduced efficacy of PP-2 after the abrasive cycles suggests the observed decrease in P % for PP-2 relative to PP-4 still holds. Abraded PP-4 pieces exhibited full log reductions relative to the control, and as such the materials exhibit broad spectrum antimicrobial efficacy even after abrasion. The effectiveness of PP-4 in killing these biofilm-forming bacteria far surpasses the durability and abrasion resistance tested for other materials with enhanced durability.[25,26,52]

The foregoing description of the preferred embodiments of the disclosure has been presented to illustrate the principles of the disclosure and not to limit the disclosure to the particular embodiment illustrated. It is intended that the scope of the disclosure be defined by all of the embodiments encompassed within the following claims and their equivalents.

REFERENCES (1) Septimus, E. J.; Schweizer, M. L. Decolonization in Prevention of Health Care-Associated Infections. *Clin. Microbiol. Rev.* 2016, 29, 201-221.
(2) Zimlichman, E.; Henderson, D.; Tamir, O.; Franz, C.; Song, P.; Yamin, C. K.; Keohane, C.; Denham, C. R.; Bates, D. W. Health Care-Associated Infections: A Meta-Analysis of Costs and Financial Impact on the US Health Care System. *JAMA Intern. Med.* 2016, 173, 2039-2046.
(3) Pittet, D.; Angus, D. C. Daily Chlorhexidine Bathing for Critically III Patients: A Note of Caution. *JAMA—J. Am. Med. Assoc.* 2015, 313, 365-366.
(4) Wilson, A. P. R.; Livermore, D. M.; Otter, J. A.; Warren, R. E.; Jenks, P.; Enoch, D. A.; Newsholme, W.; Oppenheim, B.; Leanord, A.; McNulty, C.; et al. Prevention and Control of Multi-Drug-Resistant Gram-Negative Bacteria: Recommendations from a Joint Working Party. *J. Hosp. Infect.* 2016, 92, S1-S44.
(5) Horn, N.; Bhunia, A. K. Food-Associated Stress Primes Foodborne Pathogens for the Gastrointestinal Phase of Infection. *Front. Microbiol.* 2018, 9, 1-16.
(6) Kirk, M. D.; Pires, S. M.; Black, R. E.; Caipo, M.; Crump, J. A. World Health Organization Estimates of the Global and Regional Disease Burden of 22 Foodborne Bacterial, Protozoal, and Viral Diseases, 2010: A Data Synthesis. *PLoS One* 2015, 12, 1-21.
(7) Havelaar, A. H.; Kirk, M. D.; Torgerson, P. R.; Gibb, H. J.; Hald, T.; Lake, R. J.; Praet, N.; Bellinger, D. C.; De Silva, N. R. World Health Organization Global Estimates and Regional Comparisons of the Burden of Foodborne Disease in 2010. *PloS Med.* 2015, 12, 1-23.
(8) Organization, W. H. Antimicrobial Resistance: Global Report on Surveillance; 2014.
(9) Magill, S. S.; Edwards, J. R.; Bamberg, W.; Beldays, Z. G.; Dumyati, G.; Kainer, M. A.; Lynfield, R.; Maloney, M.; McAllister-Hollod, L.; Nadle, J.; et al. Multistate Point-Prevalence Survey of Health Care—Associated Infections. *N. Engl. J. Med.* 2014, 370, 1198-1208.
(10) Andersson, D. I.; Hughes, D. Evolution of Antibiotic Resistance at Non-Lethal Drug Concentrations. *Drug Resist. Updat.* 2012, 15, 162-172.
(11) Siedenbiedel, F.; Tiller, J. C. Antimicrobial Polymers in Solution and on Surfaces: Overview and Functional Principles. *Polymers (Basel).* 2012, 4, 46-71.
(12) Ben-Knaz, R.; Pedahzur, R.; Avnir, D. A Concept in Bactericidal Materials: The Entrapment of Chlorhexidine within Silver. *Adv. Funct. Mater.* 2010, 20, 2324-2329.
(13) Porosa, L.; Caschera, A.; Bedard, J.; Mocella, A.; Ronan, E.; Lough, A. J.; Wolfaardt, G.; Foucher, D. A. UV-Curable Contact Active Benzophenone Terminated Quaternary Ammonium Antimicrobials for Applications in Polymer Plastics and Related Devices. *ACS Appl. Mater. Interfaces* 2017, 9, 27491-27503.
(14) Yeasmin, R.; Zhang, H.; Zhu, J.; Cadieux, P. Fabrication and Analysis of Antimicrobial Additives for Powder Coated Surface. *Prog. Org. Coatings* 2019, 127, 308-318.
(15) Jorica, J.; Tukaj, C.; Werel, W.; Mizerska, U.; Fortuniak, W.; Chojnowski, J. Bacterial Membranes Are the Target for Antimicrobial Polysiloxane-Methacrylate Copolymer. *J. Mater. Sci. Mater. Med.* 2016, 27, 1-14.
(16) Jutkina, J.; Marathe, N. P.; Flach, C. F.; Larsson, D. G. J. Antibiotics and Common Antibacterial Biocides Stimulate Horizontal Transfer of Resistance at Low Concentrations. *Sci. Total Environ.* 2018, 616-617, 172-178.
(17) Klibanov, A. M. Permanently Microbicidal Materials Coatings. *J. Mater. Chem.* 2007, 17, 2479-2482.
(18) Asri, L. A. T. W.; Crismaru, M.; Roest, S.; Chen, Y.; Ivashenko, O.; Rudolf, P.; Tiller, J. C.; Van Der Mei, H. C.; Loontjens, T. J. A.; Busscher, H. J. A Shape-Adaptive, Antibacterial-Coating of Immobilized Quaternary-Ammonium Compounds Tethered on Hyperbranched Polyurea and Its Mechanism of Action. *Adv. Funct. Mater.* 2014, 24, 346-355.
(19) Li, P.; Poon, Y. F.; Li, W.; Zhu, H.; Yeap, S. H.; Cao, Y.; Qi, X.; Zhou, C.; Lamrani, M.; Beuerman, R. W.; et al. A Polycationic Antimicrobial and Biocompatible Hydrogel with Microbe Membrane Suctioning Ability. *Nat. Mater.* 2010, 10, 2-9.
(20) Caschera, A.; Mistry, K. B.; Bedard, J.; Ronan, E.; Syed, M. A.; Khan, A. U.; Lough, A. J.; Wolfaardt, G.; Foucher, D. A. Surface-Attached Sulfonamide Containing Quaternary Ammonium Antimicrobials for Textiles and Plastics. *RSC Adv.* 2019, 9, 3140-3150.
(21) Tiller, J.; Liao, C. Designing Surfaces That Kill Bacteria on Contact. *Proc. Natl. Acad. Sci. U.S.A* 2001, 98, 5981-5985.
(22) Bieser, A. M.; Tiller, J. C. Mechanistic Considerations on Contact-Active Antimicrobial Surfaces with Controlled Functional Group Densities. *Macromol. Biosci.* 2011, 11, 526-534.

(23) Cerkez, I.; Kocer, H. B.; Worley, S. D.; Broughton, R. M.; Huang, T. S. N-Halamine Biocidal Coatings via a Layer-by-Layer Assembly Technique. *Langmuir* 2011, 27, 4091-4097.

(24) Kocer, H. B.; Akdag, A.; Worley, S. D.; Acevedo, O.; Broughton, R. M.; Wu, Y. Mechanism of Photolytic Decomposition of N-Halamine Antimicrobial Siloxane Coatings. *ACS Appl. Mater. Interfaces* 2010, 2, 2456-2464.

(25) Reddy, G. S.; Nadagouda, M. N.; Sekhar, J. A. Nanostructured Surfaces That Show Antimicrobial, Anticorrosive, and Antibiofilm Properties. *Key Eng. Mater.* 2012, 521, 1-33.

(26) Connelly, M. C.; Reddy, G. S.; Nadagouda, M. N.; Sekhar, J. A. Antimicrobial and Anticorrosive Efficacy of Inorganic Nanoporous Surfaces. *Clean Technol. Environ. Policy* 2017, 19, 845-857.

(27) Hartleb, W.; Saar, J. S.; Zou, P.; Lienkamp, K. Just Antimicrobial Is Not Enough: Toward Bifunctional Polymer Surfaces with Dual Antimicrobial and Protein-Repellent Functionality. *Marcomolecular Chem. Phys.* 2016, 217, 225-231.

(28) Harney, M. B.; Pant, R. R.; Fulmer, P. A.; Wynne, J. H. Surface Self-Concentrating Amphiphilic Quaternary Ammonium Biocides as Coating Additives. *ACS Appl. Mater. Interfaces* 2009, 1, 39-41.

(29) Efrati, R.; Natan, M.; Pelah, A.; Haberer, A.; Banin, E.; Dotan, A.; Ophir, A. The Combined Effect of Additives and Processing on the Thermal Stability and Controlled Release of Essential Oils in Antimicrobial Films. *J. Appl. Polym. Sci.* 2014, 131, 1-10.

(30) Murata, H.; Koepsel, R. R.; Matyjaszewski, K.; Russell, A. J. Permanent, Non-Leaching Antibacterial Surfaces-2: How High Density Cationic Surfaces Kill Bacterial Cells. *Biomaterials* 2007, 28, 4870-4879.

(31) Kügler, R.; Bouloussa, O.; Rondelez, F. Evidence of a Charge-Density Threshold for Optimum Efficiency of Biocidal Cationic Surfaces. *Microbiology* 2005, 151, 1341-1348.

(32) Gao, J.; White, E. M.; Liu, Q.; Locklin, J. Evidence for the Phospholipid Sponge Effect as the Biocidal Mechanism in Surface-Bound Polyquaternary Ammonium Coatings with Variable Cross-Linking Density. *ACS Appl. Mater. Interfaces* 2017, 9, 7745-7751.

(33) Guterman, R.; Berven, B. M.; Chris Corkery, T.; Nie, H. Y.; Idacavage, M.; Gillies, E. R.; Ragogna, P. J. Fluorinated Polymerizable Phosphonium Salts from PH3: Surface Properties of Photopolymerized Films. *J. Polym. Sci. Part A Polym. Chem.* 2013, 51, 2782-2792.

(34) Cuthbert, T. J.; Harrison, T. D.; Ragogna, P. J.; Gillies, E. R. Synthesis, Properties, and Antibacterial Activity of Polyphosphonium Semi-Interpenetrating Networks. *J. Mater. Chem. B* 2016, 4, 4872-4883.

(35) Cuthbert, T. J.; Hisey, B.; Harrison, T. D.; Trant, J. F.; Gillies, E. R.; Ragogna, P. J. Surprising Antibacterial Activity and Selectivity of Hydrophilic Polyphosphoniums Featuring Sugar and Hydroxy Substituents. *Angew. Chemie—Int. Ed.* 2018, 57, 12707-12710.

(36) Sambhy, V.; Peterson, B. R.; Sen, A. Antibacterial and Hemolytic Activities of Pyridinium Polymers as a Function of the Spatial Relationship between the Positive Charge and the Pendant Alkyl Tail. *Angew. Chemie—Int. Ed.* 2008, 47, 1250-1254.

(37) Palermo, E. F.; Lienkamp, K.; Gillies, E. R.; Ragogna, P. J. Antibacterial Activity of Polymers: Discussions on the Nature of Amphiphilic Balance. *Angew. Chemie—Int. Ed.* 2019, 58, 3690-3693.

(38) Gupta, A.; Landis, R. F.; Li, C. H.; Schnurr, M.; Das, R.; Lee, Y. W.; Yazdani, M.; Liu, Y.; Kozlova, A.; Rotello, V. M. Engineered Polymer Nanoparticles with Unprecedented Antimicrobial Efficacy and Therapeutic Indices against Multidrug-Resistant Bacteria and Biofilms. *J. Am. Chem. Soc.* 2018, 140, 12137-12143.

(39) Anastas, P. T.; Warner, J. C. Green Chemistry, Theory and Practice; Oxford University Press: New York, 1998.

(40) Alvey, L. J.; Rutherford, D.; Juliette, J. J. J.; Gladysz, J. A. Additions of PH3 to Monosubstituted Alkenes of the Formula H2C=CH(CH2)x(CF2)YCF3: Convenient, Multigram Syntheses of a Family of Partially Fluorinated Trialkylphosphines with Modulated Electronic Properties and Fluorous Phase Affinities. *J. Org. Chem.* 1998, 63, 6302-6308.

(41) Moglie, Y.; González-Soria, M. J.; Martin-Garcia, I.; Radivoy, G.; Alonso, F. Catalyst- and Solvent-Free Hydrophosphination and Multicomponent Hydrothiophosphination of Alkenes and Alkynes. *Green Chem.* 2016, 18, 4896-4907.

(42) McDonnell, A. M. P.; Beving, D.; Wang, A.; Chen, W.; Yan, Y. Hydrophilic and Antimicrobial Zeolite Coatings for Gravity-Independent Water Separation. *Adv. Funct. Mater.* 2005, 15, 336-340.

(43) Francolini, I.; Vuotto, C.; Piozzi, A.; Donelli, G. Antifouling and Antimicrobial Biomaterials: An Overview. *APMIS* 2017, 125, 392-417.

(44) Borgs, C.; De Coninck, J.; Kotecý, R.; Zinque, M. Does the Roughness of the Substrate Enhance Wetting? *Phys. Rev. Lett.* 1995, 74, 2292-2294.

(45) Herminghaus, S. Roughness-Induced Non-Wetting. *Europhys. Lett.* 2000, 52, 165-170.

(46) Cao, L.; Hu, H. A.; Gao, D. Design and Fabrication of Micro-Textures for Inducing a Superhydrophobic Behavior on Hydrophilic Materials. *Langmuir* 2007, 23, 4310-4314.

(47) Ronan, E.; Yeung, C. W.; Hausner, M.; Wolfaardt, G. M. Interspecies Interaction Extends Bacterial Survival at Solid—Air Interfaces. *Biofouling* 2013, 29, 1087-1096.

(48) Stone, W.; Kroukamp, O.; Korber, D. R.; McKelvie, J.; Wolfaardt, G. M. Microbes at Surface-Air Interfaces: The Metabolic Harnessing of Relative Humidity, Surface Hygroscopicity, and Oligotrophy for Resilience. *Front. Microbiol.* 2016, 7,1-15.

(49) Blundell, R. K.; Licence, P. Quaternary Ammonium and Phosphonium Based Ionic Liquids: A Comparison of Common Anions. *Phys. Chem. Chem. Phys.* 2014, 16, 15278-15288.

(50) Sattar, S. A.; Bradley, C.; Kibbee, R.; Wesgate, R.; Wilkinson, M. A. C.; Sharpe, T.; Maillard, J. Y. Disinfectant Wipes Are Appropriate to Control Microbial Bioburden from Surfaces: Use of a New ASTM Standard Test Protocol to Demonstrate Efficacy. *J. Hosp. Infect.* 2015, 91, 319-325.

(51) ASTM D5402-19 Standard Practice for Assessing the Solvent Resistance of Organic Coatings Using Solvent Rubs. 2019.

(52) Gao, J.; Huddleston, N. E.; White, E. M.; Pant, J.; Handa, H.; Locklin, J. Surface Grafted Antimicrobial Polymer Networks with High Abrasion Resistance. *ACS Biomater. Sci. Eng.* 2016, 2, 1169-1179.

Therefore what is claimed is:

1. A phosphonium compound having the following formula:

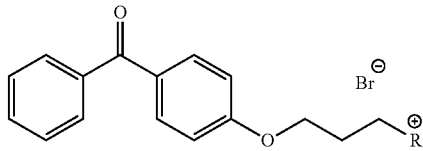

wherein R is a phosphonium group substituted with alkyl, aryl, substituted alkyl, substituted aryl, heteroalkyl or any combination thereof.

2. The phosphonium compound according to claim 1, wherein the alkyl has a general formula $C_nX_{2n+1}$ wherein n is an integer ranging between 1 and 18.

3. The phosphonium compound according to claim 1, wherein the substituted alkyl has a general formula $C_nX_{2n+1}$ wherein X is hydrogen and/or one or more of substituents, and n is an integer ranging between 1 and 18.

4. The phosphonium compound according to claim 1, wherein the substituted alkyl has a number of carbon atoms in a range between 1 and 18.

5. The phosphonium compound according to claim 3, wherein the substituents comprise fluorine.

6. The phosphonium compound according to claim 1, wherein the substituted aryl has substituents at any one, or more of, ortho, meta and para positions.

7. The phosphonium compound according to claim 6, wherein the substituents comprise an alkyl or a heteroalkyl, wherein the alkyl is optionally substituted.

8. The phosphonium compound according to claim 7, wherein the alkyl is substituted with fluorine.

9. The phosphonium compound according to claim 1, wherein the phosphonium group is any one of (i), (ii), (iii), (iv) or (v):

(i)

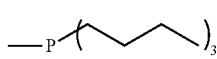

(ii)

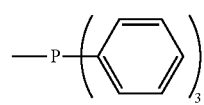

(iii)

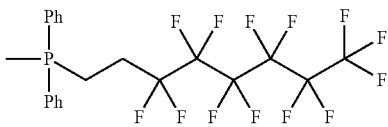

(iv)

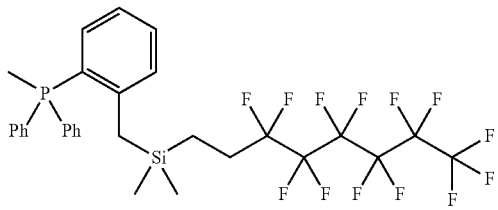

(v)

wherein Ph is a phenyl ring.

10. The phosphonium compound according to claim 9, wherein the R is the phosphonium group (ii), such that the phosphonium compound has the formula (2),

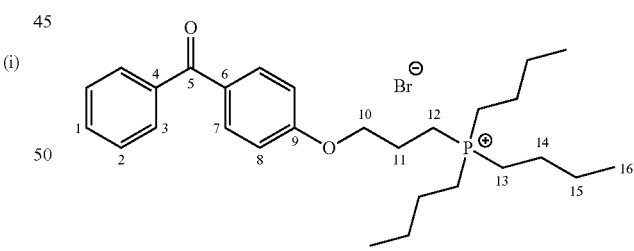

2 said phosphonium compound having the formula (2) exhibiting antimicrobial activity.

11. An antimicrobial composite material comprising the phosphonium compound according to claim 10, and a polymer.

12. The antimicrobial composite material according to claim 11, wherein said polymer is a thermoplastic polymer, and wherein said phosphonium compound having the formula (2) is covalently bound to the thermoplastic polymer lattice.

13. The antimicrobial composite material according to claim 11, wherein said antimicrobial composite material is produced by coextruding the polymer with the phosphonium compound having the formula (2).

14. A UV-curable coating comprising the phosphonium compound according to claim 10, to be applied on a substrate surface.

15. The UV-curable coating according to claim 14, wherein the substrate is a polymer plastic.

16. The phosphonium compound according to claim 9, wherein the R is the phosphonium group (iii), such that the phosphonium compound has the formula (3):

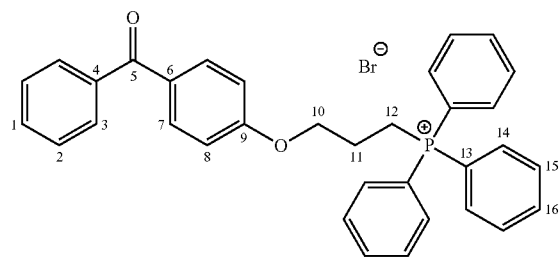

said phosphonium compound having the formula (3) exhibiting antimicrobial activity.

17. An antimicrobial composite material comprising phosphonium compound according to claim 16.

18. The antimicrobial composite material according to claim 17, wherein said polymer is a thermoplastic polymer, and wherein said phosphonium compound having the formula (3) is covalently bound to the thermoplastic polymer lattice.

19. The antimicrobial composite material according to claim 17, wherein said antimicrobial composite material is produced by coextruding the polymer with the phosphonium compound having the formula (3).

20. A UV-curable coating comprising the phosphonium compound according to claim 16, to be applied on a substrate surface.

21. The UV-curable coating according to claim 20, wherein the substrate is a polymer plastic.

22. The phosphonium compound according to claim 9 wherein the R is the phosphonium group (iv), such that the phosphonium compound has the formula (4):

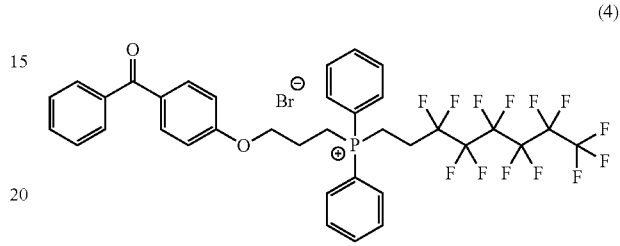

said phosphonium compound having the formula (4) exhibiting antimicrobial activity.

23. An antimicrobial composite material comprising the phosphonium compound according to claim 22, and a polymer.

24. The antimicrobial composite material according to claim 23, wherein said polymer is a thermoplastic polymer, and wherein said phosphonium compound having the formula (4) is covalently attached to the thermoplastic polymer lattice.

25. The antimicrobial composite material according to claim 24, wherein said antimicrobial composite material is produced by coextruding the polymer with the phosphonium compound having the formula (4).

26. A UV-curable coating comprising the phosphonium compound according to claim 22, to be applied on a substrate surface.

27. The UV-curable coating according to claim 26, wherein the substrate is a polymer plastic.

28. The phosphonium compound according to claim 9, wherein the R is the phosphonium group (i) such that the compound has the formula (1)

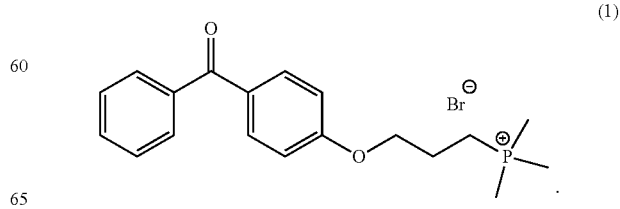

29. The phosphonium compound according to claim 9, wherein the R is the phosphonium group (v) such that the compound has the formula (5)
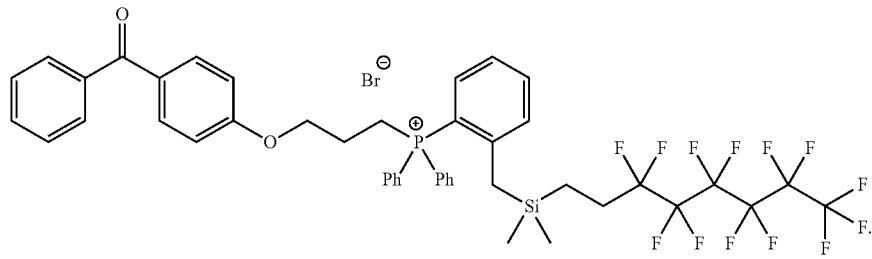
(5)